(12) United States Patent
Harvesf et al.

(10) Patent No.: US 11,038,762 B2
(45) Date of Patent: Jun. 15, 2021

(54) ARBITRARILY GROUPING COMPUTER SYSTEM RESOURCES

(71) Applicant: Google LLC, Mountain View, CA (US)

(72) Inventors: Cyrus Harvesf, Mountain View, CA (US); Marco Cavalli, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/579,180

(22) Filed: Sep. 23, 2019

(65) Prior Publication Data

US 2021/0092016 A1    Mar. 25, 2021

(51) Int. Cl.
G06F 15/173 (2006.01)
H04L 12/24 (2006.01)
H04L 29/08 (2006.01)
H04L 29/06 (2006.01)

(52) U.S. Cl.
CPC .......... H04L 41/0893 (2013.01); H04L 67/10 (2013.01); H04L 67/306 (2013.01); H04L 63/20 (2013.01)

(58) Field of Classification Search
CPC ... H04L 41/0893; H04L 67/306; H04L 67/10; H04L 63/20
See application file for complete search history.

(56) References Cited

U.S. PATENT DOCUMENTS

| | | | |
|---|---|---|---|
| 9,058,198 B2 | 6/2015 | McGrath et al. | |
| 2014/0207861 A1* | 7/2014 | Brandwine | H04L 51/32 709/204 |
| 2017/0339070 A1* | 11/2017 | Chang | H04L 47/829 |
| 2018/0352002 A1 | 12/2018 | Ramachandran et al. | |

OTHER PUBLICATIONS

International Search Report and Written Opinion for the related Application No. PCT/US2020/051936, dated Sep. 22, 2020, 15 pages.

* cited by examiner

*Primary Examiner* — Padma Mundur
(74) *Attorney, Agent, or Firm* — Honigman LLP; Brett A. Krueger

(57) ABSTRACT

A method for arbitrarily grouping computer system resources includes receiving a resource policy to be applied to a group of resources associated with a user. The resource policy includes a unique user-defined label assigned to each resource of the group of resources. The method also includes identifying the group of resources among a plurality of resources using the user-defined label. Here, the plurality of resources is associated with the user and distributed across a plurality of different computing environments. For each identified resource of the group of resources, the method also includes applying the resource policy to a corresponding identified resource by accessing the respective computing environment where the corresponding identified resource resides.

18 Claims, 8 Drawing Sheets

ARBITRARILY GROUPING COMPUTER SYSTEM RESOURCES

TECHNICAL FIELD

This disclosure relates to arbitrarily grouping computer system resources.

BACKGROUND

As more and more users utilize computing environments (e.g., cloud computing), there is a greater likelihood that a user has or uses resources in separate computing environments. Even though more options for computing environments may lead to innovation and/or cost effective computing environment providers, unfortunately, this presents potential issues for resource management. For instance, computing environments may have proprietary features or features that deviate from one provider to the next. With even small differences, the configuration of a user's resources inevitably will be inconsistent across all computing platforms. By having such inconsistencies, users may be left coping with their own management methods especially when a user changes providers or decides to consolidate providers.

SUMMARY

One aspect of the disclosure provides a method for arbitrarily grouping computer system resources. The method includes receiving, at data processing hardware, a resource policy to be applied to a group of resources associated with a user. The resource policy includes a unique user-defined label assigned to each resource of the group of resources. The method also includes identifying, by the data processing hardware, the group of resources among a plurality of resources using the user-defined label. The plurality of resources are associated with the user and distributed across a plurality of different computing environments in communication with the data processing hardware. For each identified resource of the group of resources, the method includes applying, by the data processing hardware, the resource policy to a corresponding identified resource by accessing the respective computing environment where the corresponding identified resource resides.

Implementations of the disclosure may include one or more of the following optional features. In some implementations, the unique user-defined label includes a key-value pair. The resource policy may include a constraint for the key of the key-value pair for the unique user-defined label. Additionally or alternatively, the resource policy may include a constraint for the value of the key-value pair for the label. Optionally, the resource policy may include a first policy for the key of the key-value pair and a second policy for the value of the key-value pair.

In some examples, the resource policy includes at least one of an access control policy, a firewall policy, a networking policy, or a quota policy. The plurality of computing environments may include at least one private computing environment and at least one public computing environment. The data processing hardware may be configured to communicate with on-premise computing environments, private computing environments, and public cloud-based computing environments. The plurality of resources may include at least one of a virtual machine, a database, a key-value store, or a network.

Another aspect of the disclosure provides a method for applying policies to computer system resources in a computing environment. The method includes receiving, at data processing hardware, a resource policy to be applied to a group of resources associated with a user. The resource policy includes a unique user-defined label assigned to each resource of the group of resources. The unique user-defined label includes a key-value pair. The method further includes identifying, by the data processing hardware, the group of resources among a plurality of resources using the user-defined label and associated with the user. For each identified resource of the group of resources, the method also includes applying, by the data processing hardware, the resource policy to a corresponding identified resource by governing the key-value pair of the unique user-defined label.

This aspect may include one or more of the following optional features. In some configurations, the resource policy includes a constraint for the key of the key-value pair for the unique user-defined label. The resource policy may include a constraint for the value of the key-value pair for the label. The resource policy may also include a first policy for the key of the key-value pair and a second policy for the value of the key-value pair. The resource policy may include at least one of an access control policy, a firewall policy, a networking policy, or a quota policy. Optionally, the plurality of resources may include at least one of a virtual machine, a database, a key-value store, or a network.

Yet another aspect of the disclosure provides a system for arbitrarily grouping computer system resources. The system includes data processing hardware and memory hardware in communication with the data processing hardware. The memory hardware stores instructions that when executed on the data processing hardware cause the data processing hardware to perform operations. The operations include receiving a resource policy to be applied to a group of resources associated with a user, the resource policy includes a unique user-defined label assigned to each resource of the group of resources. The operations also include identifying the group of resources among a plurality of resources using the user-defined label. The plurality of resources are associated with the user and distributed across a plurality of different computing environments in communication with the data processing hardware. For each identified resource of the group of resources, the operations also include applying the resource policy to a corresponding identified resource by accessing the respective computing environment where the corresponding identified resource resides.

This aspect may include one or more of the following optional features. In some implementations, the unique user-defined label includes a key-value pair. The resource policy may include a constraint for the key of the key-value pair for the unique user-defined label. Additionally or alternatively, the resource policy may include a constraint for the value of the key-value pair for the label. Optionally, the resource policy may include a first policy for the key of the key-value pair and a second policy for the value of the key-value pair.

In some examples, the resource policy includes at least one of an access control policy, a firewall policy, a networking policy, or a quota policy. The plurality of computing environments may include at least one private computing environment and at least one public computing environment. The data processing hardware may be configured to communicate with on-premise computing environments, private computing environments, and public cloud-based computing environments. The plurality of resources may include at least one of a virtual machine, a database, a key-value store, or a network.

Yet another aspect of the disclosure provides a system for arbitrarily grouping computer system resources. The system includes data processing hardware and memory hardware in communication with the data processing hardware. The memory hardware stores instructions that when executed on the data processing hardware cause the data processing hardware to perform operations. The operations include receiving a resource policy to be applied to a group of resources associated with a user. The resource policy includes a unique user-defined label assigned to each resource of the group of resources. The unique user-defined label includes a key-value pair. The operations also include identifying the group of resources among a plurality of resources using the user-defined label and associated with the user. For each identified resource of the group of resources, the operations also include applying the resource policy to a corresponding identified resource by governing the key-value pair of the unique user-defined label.

This aspect may include one or more of the following optional features. In some configurations, the resource policy includes a constraint for the key of the key-value pair for the unique user-defined label. The resource policy may include a constraint for the value of the key-value pair for the label. The resource policy may also include a first policy for the key of the key-value pair and a second policy for the value of the key-value pair. The resource policy may include at least one of an access control policy, a firewall policy, a networking policy, or a quota policy. Optionally, the plurality of resources may include at least one of a virtual machine, a database, a key-value store, or a network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Today people (also referred to as users or customers) typically have computing resources that run across multiple computing environments (e.g., cloud-based computing environments). Each individual computing environment may have its own unique interface facilitating a customer's interaction with the resources within the computing environment. For instance, the interface facilitates how to create computing instances or how to define policies for the resources. Since a user may utilize more than one computing environment for his or her resources, differences between interfaces for these computing environments is likely to lead to diverging management capabilities for the user's resources. In other words, when a user has resources across multiple computing environments, the user may not be able to manage all of his or her resources in the same manner (e.g., using a single interface) due to management limitations or proprietary forms of resource management at a particular computing environment. At best, the burden is on the user to maintain his or her own uniform resource management, if possible.

Figure 1A:
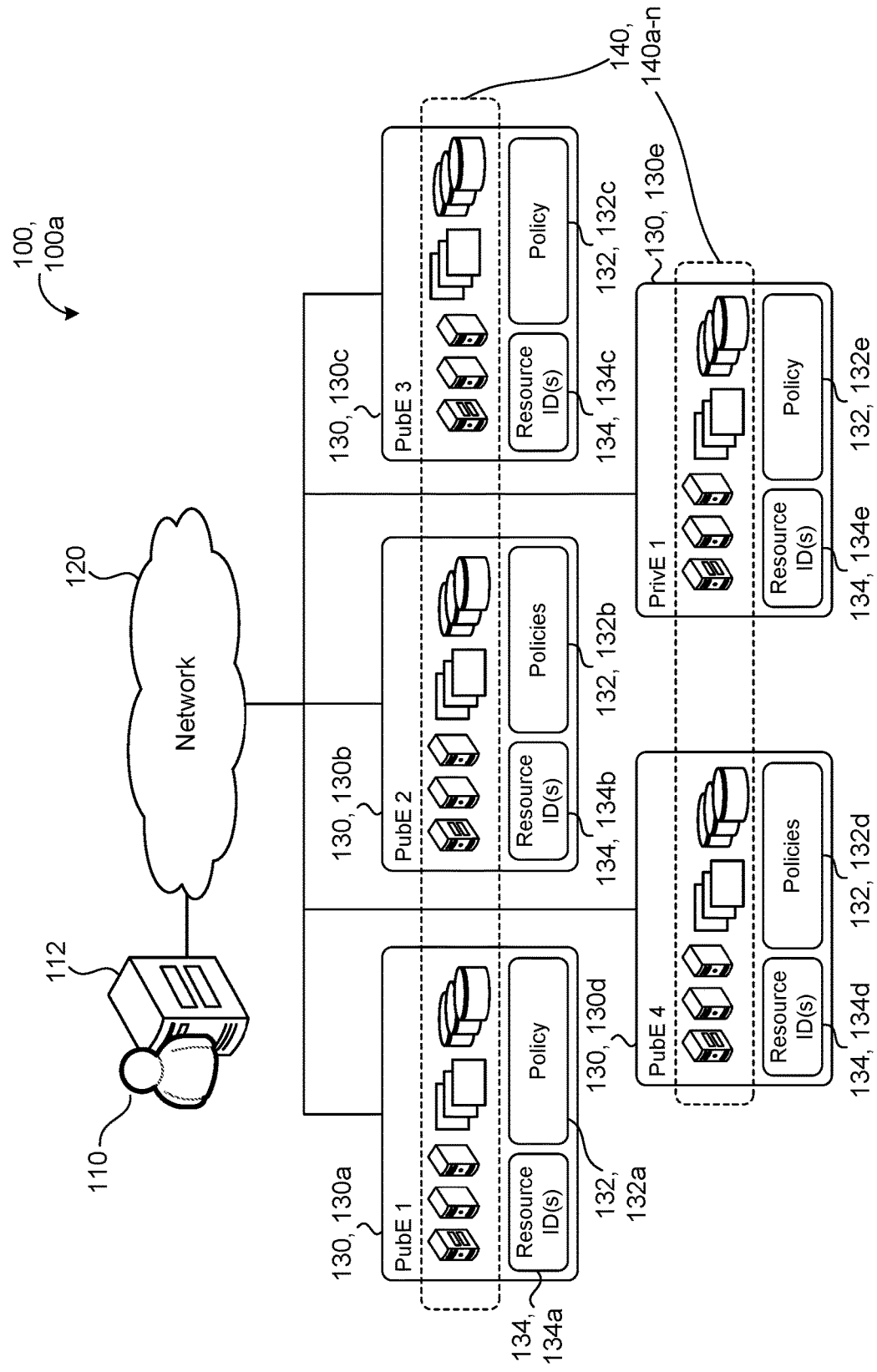
FIGS. 1A and 1B are schematic views of example multi-environment systems.

FIG. 1A is an example of a traditional multi-environment system 100, 100a for a user's resources. Here, a user 110, with a user device 112 (e.g., a computer, laptop, tablet, mobile phone, wearable, smart device, etc.), communicates across a network 120 to one or more computing environments 130 (e.g., cloud computing environments) where his or her resources 140 reside. The user 110 generally refers to an entity that owns or has some rights to access and/or to manage one or more computing resources 140. For instance, the user 110 is a customer of one or more computing environment providers (e.g., cloud computing service provider). Based on various activities of the user 110, the user 110 may have resources 140 distributed across multiple computing environments 130. In some examples, the user 110 refers to an enterprise (e.g., an organization) that may include a number of employees that interact with resources 140 across one or more computing environments 130. For instance, the enterprise is an organization with different offices, teams, departments, business units, or job functions that preside over resources 140. In other words, the user 110 may refer to a single person or a group of people.

Figure 1B:
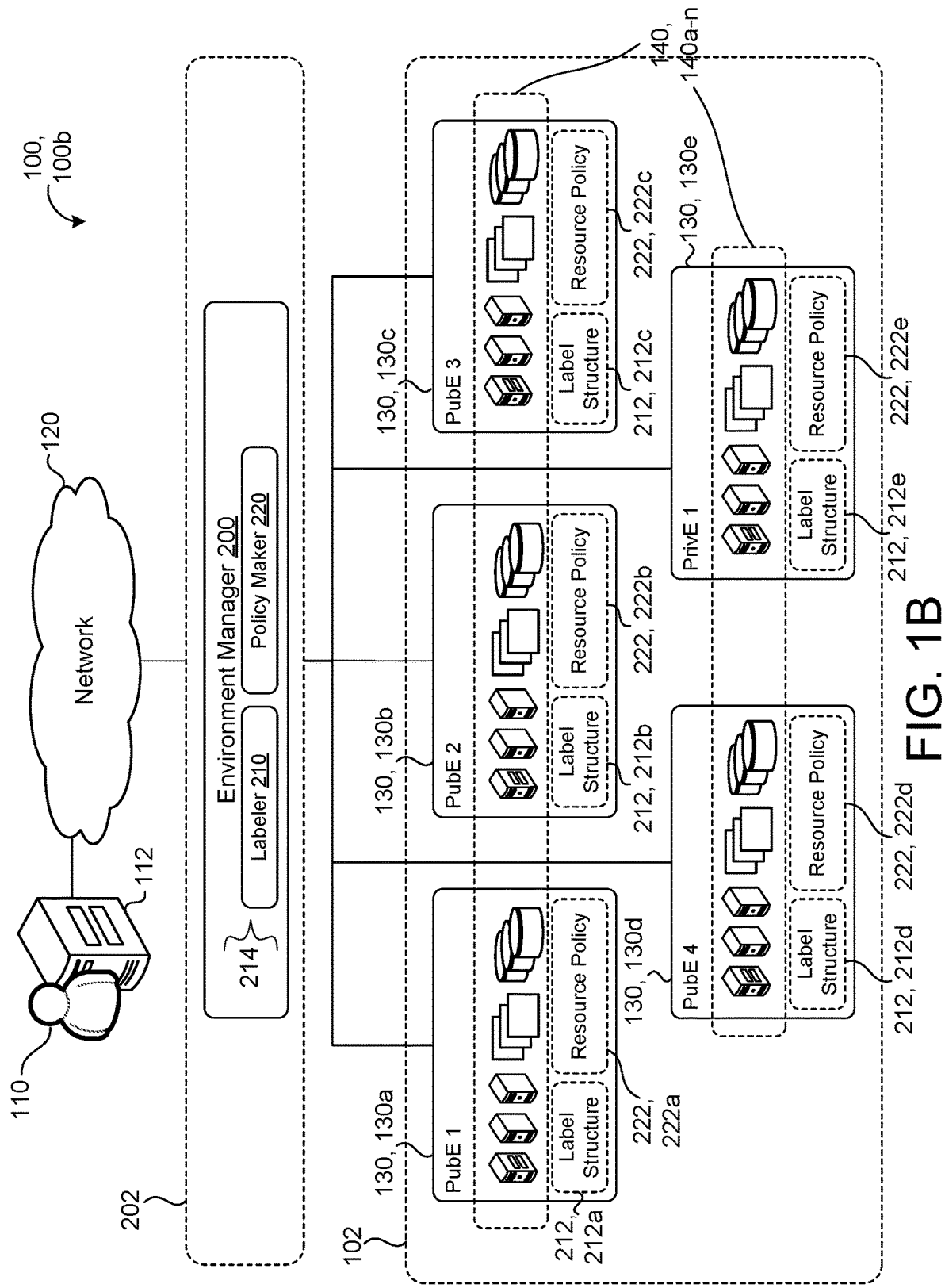

The resources 140 of the user 110 generally refer to computing resources such as networks, servers, storage (e.g., databases, data stores, key-value stores), virtual machines (VMs), or other resources related to applications and services (e.g., clusters). For example, FIGS. 1A and 1B illustrate the user 110 interacting with resources 140, 140a-n such as servers, VMs, and databases in each computing environment 130. The user 110 may interact with these resources 140 using an application (e.g., a web-browser application) executable on the user device 112. Although each computing environment 130 is shown with a similar number of resources 140, the number of resources 140 within a computing environment 130 may vary and/or be scalable; allowing a computing environment 130 to have any number of resources 140 of the user 110 (e.g., whether balanced between computing environments 130 or not).

The user 110 may use a number of different computing environments 130 upon which to host, to store, or to execute functionality related to resources 140. For example, one or more of the computing environments 130 correspond to cloud computing environments. Here, the type of computing environment 130 may vary, but, generally speaking, a computing environment 130 attempts to provide a convenient and on-demand environment with network access to provision resources (e.g., resources 140 with minimal management effort or service provider interaction). Some examples of computing environments 130 include public computing environments PubE (e.g., the computing environments 130, 130a-d) or private computing environments PrivE (e.g., the computing environments 130, 130e). A public computing environment PubE refers to a computing environment 130 offered to the general public with shared access to computing hardware (e.g., data processing hardware or memory hardware) within the computing environment 130. On the other hand, a private computing environment PrivE refers to an exclusive computing environment 130 for one or more users 110 authorized to access the computing environment 130. In some examples, a user 110 uses a private computing environment PrivE for security reasons or perhaps to comply with various data regulations (e.g., to secure private data). A private computing environment PrivE may be configured by a computing environment provider with special customization or stem from resource partitions made in a public computing environment PubE.

Another example of a computing environment 130 is an on-premise computing environment 130. An on-premise computing environment 130 generally refers to a computing environment 130 setup at a location of the user 110. This type of computing environment 130 based on its location is generally private, but may, in some configurations, be accessible more publically or on a limited basis. Because the user 110 may use different computing environments 130 for different reasons, the user 110 may have to interact with different types of computing environments 130. For instance, FIGS. 1A and 1B show four public computing environments 130a-d and one private computing environment 130e. Even though a user 110 may prefer to have his or her own private computing environment PrivE, this may be unreasonable (e.g., from a cost perspective) or difficult in all circumstances; resulting in the user 110 having resources 140 associated with multiple types of computing environments 130.

Each computing environment 130 may have different configurations for the management of resources 140 residing within computing environment 130. These configurations may define policies 132 that set forth guidelines for operations in the computing environment 130. Policies 132 may be configured for integrity (e.g., resource integrity or more general integrity of the computing environment as a whole), security, privacy, financial management, cost optimization, performance management, etc. Some policies 132 are constraint-based (e.g., constrain how a resource 140 operates). In other words, a constraint may refer to a policy that restricts use or operation of a resource. For instance, access control policies $132_{ACP}$ (ACP) designate which entities may access and/or control one or more resources 140. Other examples of policies 132 include firewall policies (e.g., block/allow network traffic), networking policies (e.g., rule(s) for network access), or quota policies (e.g., quotas that dictate resource allocation/usage). Policies 132 may be specific to a resource 140 or a characteristic of a resource 140 (e.g., a type of resource 140, an owner of the resource 140, a function of a resource 140, etc.) or more broadly applied (e.g., universal policies 132 for the computing environment 130). In some examples, an administrator of the computing environment 130 configures one or more policies 132. In some implementations, the user 110 configures one or more policies 132 (e.g., customizes policies 132 for different resources 140). In yet other examples, policies 132 are set by a mix of the administrator and the user 110.

In some examples, a computing environment 130 manages resources 140 with a resource identifier (ID) 134. The resource ID 134 may include information about the resource 140, a unique identifier (UID) assigned to a resource 140 (e.g., by an administrator or a user 110 of the computing environment 130), and/or some form of a label or tag for the resource 140. For example, an architect of a computing environment 130 generates the resource ID 134 during configuration of the computing environment 130 and/or allocation of resources 140 (e.g., to users 110). In some examples, the resource ID 134 includes a location of the resource 140 within the computing environment 130. Unfortunately for a user 110, each computing environment 130 often includes its own form of resource IDs 134 or lack thereof. For instance, FIG. 1A of the traditional multi-environment system 100a illustrates a different resource ID system for each computing environment 130 (e.g., resources IDs 134, 134e). In other words, some resource IDs 134 may be proprietary to the computing environment 130 or managed with varying degrees of standards. Because of the potential variance in these resource IDs 134 within a single computing environment 130 or issues with cross compatibility between different types of resource IDs 134 among multiple computing environments 130, the universal management of resources 140 by resource IDs 134 may be quite difficult.

Due to at least these reasons, universal policy management at a resource ID level is generally disadvantageous. For instance, some computing environments 130 include resource IDs 134, but do not permit policies 132 to be applied at the resource ID level. Other computing environments 130 have resource IDs 134, but these resource IDs are not cross compatible between computing environments 130. Moreover, besides general compatibility issues, when computing environments 130 have resource IDs 134, these computing environments 130 do not have a means to apply policies 132 to a substance of the resource ID 134 such as underlying details or features of the resource ID 134. Without substantive application, policies 132 such as access controls become burdensome to implement for security or privacy purposes at scale. To overcome some of these issues, an environment manager 200 (also referred to as manager 200) at a management layer 202 is configured to manage structures of resource IDs 134 and to make policies 132 utilizing the structures across one or more computing environments 130.

FIG. 1B is similar to FIG. 1A except that the multi-environment system 100, 100b includes layers 102, 202 with the manager 200 on the management layer 202 managing one or more computing environments 130, 130a-e on an environment layer 202. The management layer 202 refers to an abstraction layer that is interoperable with multiple different computing environments 130 (i.e., interoperable with the environment layer 202). For instance, the manager 200 has access to the computing environment(s) 130 to perform functions of a labeler 210 and a policy maker 220. Here, the environment layer 102 refers to a layer that includes one or more computing environments 130 (e.g., the different computing environments 130, 130a-e). Although FIG. 1B depicts the manager 200 communicating with five computing environments 130a-e, the manager 200 may communicate with any number of computing environments 130 to enable various degrees of scaling (e.g., more or less computing environments 130).

In some examples, the labeler 210 is configured to define a label structure 212 for resources 140 of the user 110. Here, the label structure 212 refers to a namespace for resources 140. Some examples of label structures 212 include associative arrays such as a key-value pair 214. A key-value pair 214 is a label structure 212 that maps a key index (i.e., a key 214, 214K) to a particular data value (i.e., a value 214, 214v). Both the key 214K and the value 214v as a whole may define a particular label 216. More generally speaking, a label 216 (FIG. 2A) refers to a unique user-defined string of characters in the namespace. As part of the manager 200, the labeler 210 may apply and/or manage the label structure 212

(or more particularly a given label 216) across to any number of computing environments 130 in communication with the manager 200 (e.g., all computing environments 130). For instance, FIG. 1B illustrates the label structures 212, 212a-e in dotted lines within each computing environment 130 of the environment layer 102. In other words, the user 110 (e.g., through the labeler 210) may generate a standard label structure 212 that may be applied to his or her resources 140 without the user 110 having to manage such a label structure 212 at each computing environment 130. In some examples, the user 110 manages at the manager 200 whether the label structure 212 is applied universally (e.g., to all resources 140 of the user 110) or more selectively to a subset of all resources 140 of the user 110 (e.g., to a single resource 140 or a group of resources 140). The user device 112 may execute an application that implements a user interface for allowing the user 110 to interact with the manager 200. In some implementations, the policy maker 220 is configured to generate a resource policy 222. Here, when a policy 132 impacts a resource 140, it may be referred to as a resource policy 222 (e.g., as shown FIG. 1B). In some examples, the manager 200 leverages its creation of label structures 212 across one or more computing environments 130 by having the policy maker 220 generate one or more resource policies 222, 222a-e for a given label 216 formed according to the label structure 212. With this approach, resources 140 may be controlled through resource policies 222 operating at a label level. Furthermore, the manager 200 may centrally control resource policies 222 for a user 110 as resources 140 of the user 110 are labeled or updated with labels 216. By having central control, the manager 200 may provide a consistent management experience across hybrid computing environments 130 even as these computing environments 130 continually grow or change.

Figure 2A:
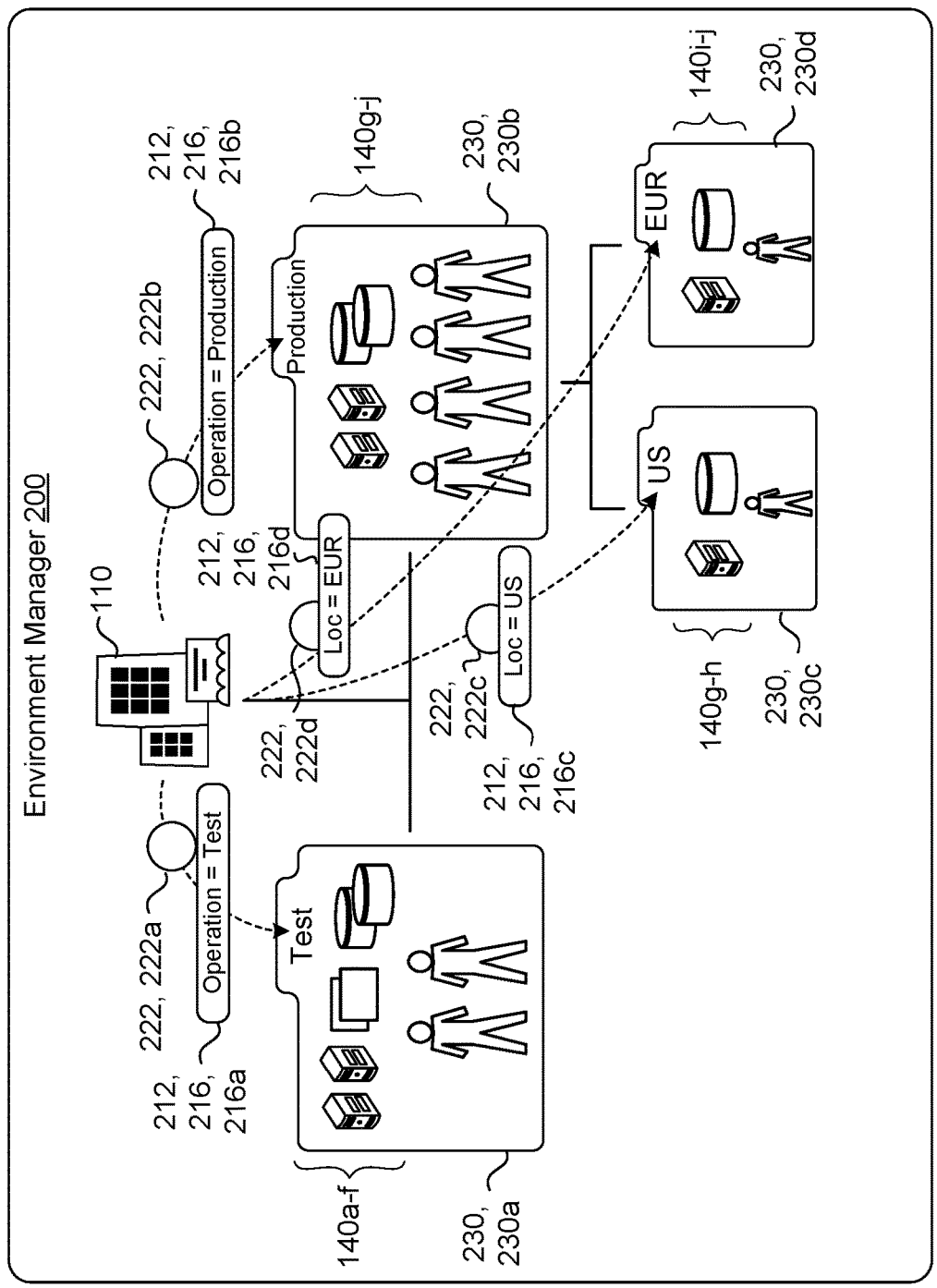
FIGS. 2A and 2B are schematic views of an example environment manager.

Referring to FIG. 2A, in some examples, the user 110 uses the manager 200 to generate labels 216 (e.g., with the labeler 210) to convey resources policies 222 to control resources 140. Here, the user 110 forms arbitrary groups 230, 230a-d by assigning a number of resources 140 the same label 216 or same set of labels 216. With groups 230 of resources 140, the groups 230 can then be controlled through resources policies 222 generated by the policy maker 220 of the manager 200. With this approach, a label 216 may be overlain on top of a resource hierarchy (i.e., a hierarchy of groupings 230) and allow the manager 200 to generate controls (e.g., access control policies $132_{ACP}$) as resource policies 222 for the entire hierarchy. Furthermore, separate groups 230 formed by different labels 216 may correspond to separate controls that caters to roles or purposes of a group 230.

For example, in FIG. 2A, the user 110 is an organization. As an organization, the user 110 may have resources 140 for different units or functions of the organization. For example, a test team formed by two employees uses resources 140, 140a-f in an on-premise computing environment 130 for performing testing for the organization. Similarly, a production team with six employees has/uses resources 140, 140g-j in a private computing environment PrivE. Here, the organization 110 uses the manager 200 to define access control policies $132_{ACP}$ for these different teams. For instance, the user 110 groups the test team into a first group 230, 230a by assigning the resources 140a-f with the same label 216, 216a of "operation=test." Here, the characters "operation" refer to the key 214k of the label 216a while the characters "test" refer to the value 214v of the label 216a. With the label 216a of "operation=test," the user 110 uses the manager 200 to generate a first resource policy 222, 222a specific to the test team formed by two employees, employee A and employee B. In other words, the first resource policy 222a defines that employee A and employee B have control access to resources 140a-f (i.e., resources 140a-f labeled "operation=test").

For the production team formed by six employees, the user 110 uses the manager 200 to assign production resources 140g-j with the label 216b of "operation=production" to form a production group 230, 230b. Here, the labeler 210 (e.g., by input of the user 110) assigned the same key 214k "operation" to a different value 214v "production" to differentiate between testing operations and production operations. With the production group 230b, the manager 200 receives a second resource policy 222, 222b to be applied to the production group 230b that allows four of the six employees to have access control to all resources 140g-j within the group 230b (i.e., all resources 140g-j that belong to the production team). To go one step further, the user 110, as an organization, may have production in the United States and production in Europe that uses different production resources 140 (e.g., U.S. production resources 140g-h and European production resources 140i-j). To be able to apply policies 132 to these production sub-units, the user 110 forms a third group 230, 230c by labeling the U.S. production resources 140g-h with the third label 216, 216c of "Loc=US" and a fourth group 230, 230d by labeling the European production resources 140i-j with the fourth label 216, 216d of "Loc=EUR." Here, by assigning the third label 216c and the fourth label 216d the resource policies 222, 222c-d, the manager 200 may provide a fifth employee access to resources 140g-h and a sixth employee access to resources 140i-j. In other words, the fifth employee may be at the specific U.S. production plant and receive access to U.S. production resources 140g-h without receiving access to other production resources 140i-j. The same applies for the sixth employee. The sixth employee may be at a specific European production plant and receive access to European production resources 140i-j without receiving access to other production resources 140g-h (e.g., U.S. production resources 140g-h). In this example, the four employees that receive access to all production resources 140g-j may be production engineers that interface with either facility in the United States or Europe and thus need global access.

Figure 2B:
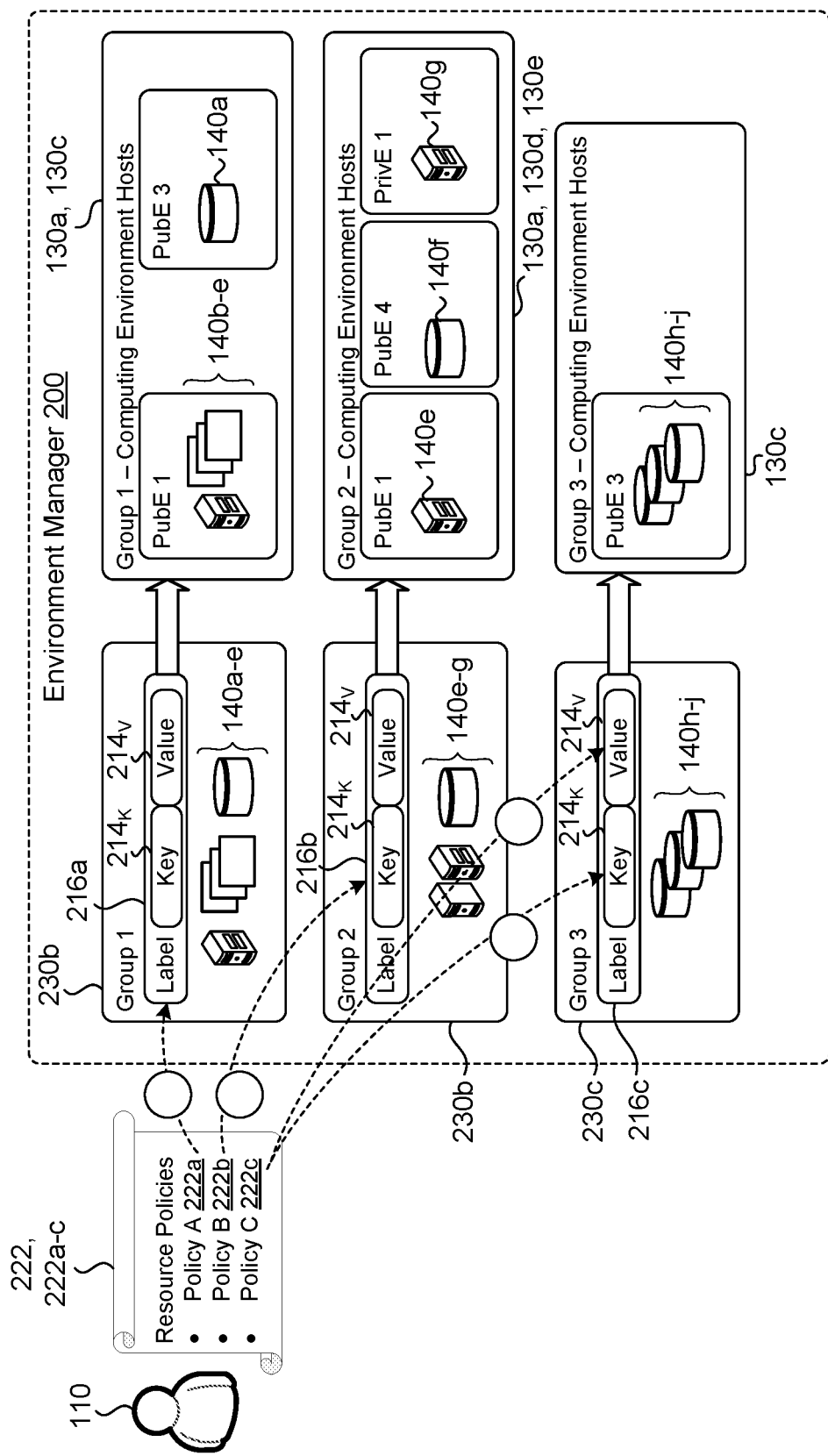

FIG. 2B further elaborates on the functionality of the manager 200 by illustrating the manager 200 applying the resource policy 222 to each resource 140 within a group 230 regardless of its computing environment 130. More particularly, the manager 200 is able to use its compatibility with the environment layer 102 to access computing environments 130 to apply resource policies 222 where each resource 140 of a group 230 resides. In some implementations, such as FIG. 2B, the manager 200 receives multiple resource policies 222a-c from the user 110 to apply to the unique user-defined labels 216a-c that form groups 230a-c. Here, FIG. 2B depicts resources 140 with their associated computing environments 130 of FIG. 1B. In this example, the resources 140a-e of the first group 230a with label 216a correspond to a resource 140a within the third computing environment 130c and four resources 140b-e of the first computing environment 130a such that the manager 200 applies the first policy 222a to resources 140 located within both of those computing environments 130a, 130c. In a similar manner, the resources 140e-g of the second group 230b with label 216b correspond to a resource 140e within the first computing environment 130a, a resource 140f within the fourth computing environment 130d, and a resource 140g in the fifth computing environment 130e. For the second group 230b, the manager 200 applies the second policy 222b to resources 140e-g within these three environments 130a, 130d, 130e. For the third group 230c, the resources 140h-j with label 216c correspond to a three resource 140h-j within the third computing environment 130c such that the manager 200 applies the third policy 222c to the third computing environment 130c.

In some examples, such as FIG. 2B, a policy (e.g., the third policy 222c) applies to one or both of the key-value pair 214 forming the label 216. In other words, the manager 200 is configured to apply a policy 132 to a key 214K of the label 216, to a value 214v of the label 216, or at the entire label 216 as previously described. To illustrate with an access control policy $132_{ACP}$, the manager 200 may receive a resource policy 222 from the user 110 that restricts those who may control labeling (or grouping) resources 240 with a particular key 214K and/or value 214v. This approach may prevent someone with access to a resource 140 from changing its label 216 in a detrimental way. Using the organization of FIG. 2A, an engineering member of the production team may not want a production employee at the European production plant to change a label 216 for a resource 140 to assign it from Europe to the U.S. Therefore, the manager 200 may apply a resource policy 222 that is an access control policy restricting employees in Europe from changing the value 214v of "EUR." Additionally or alternatively, the same employee could be restricted with a resource policy 222 from changing the key 214K from "Loc" to the key 214K of "operation."

Figure 2C:
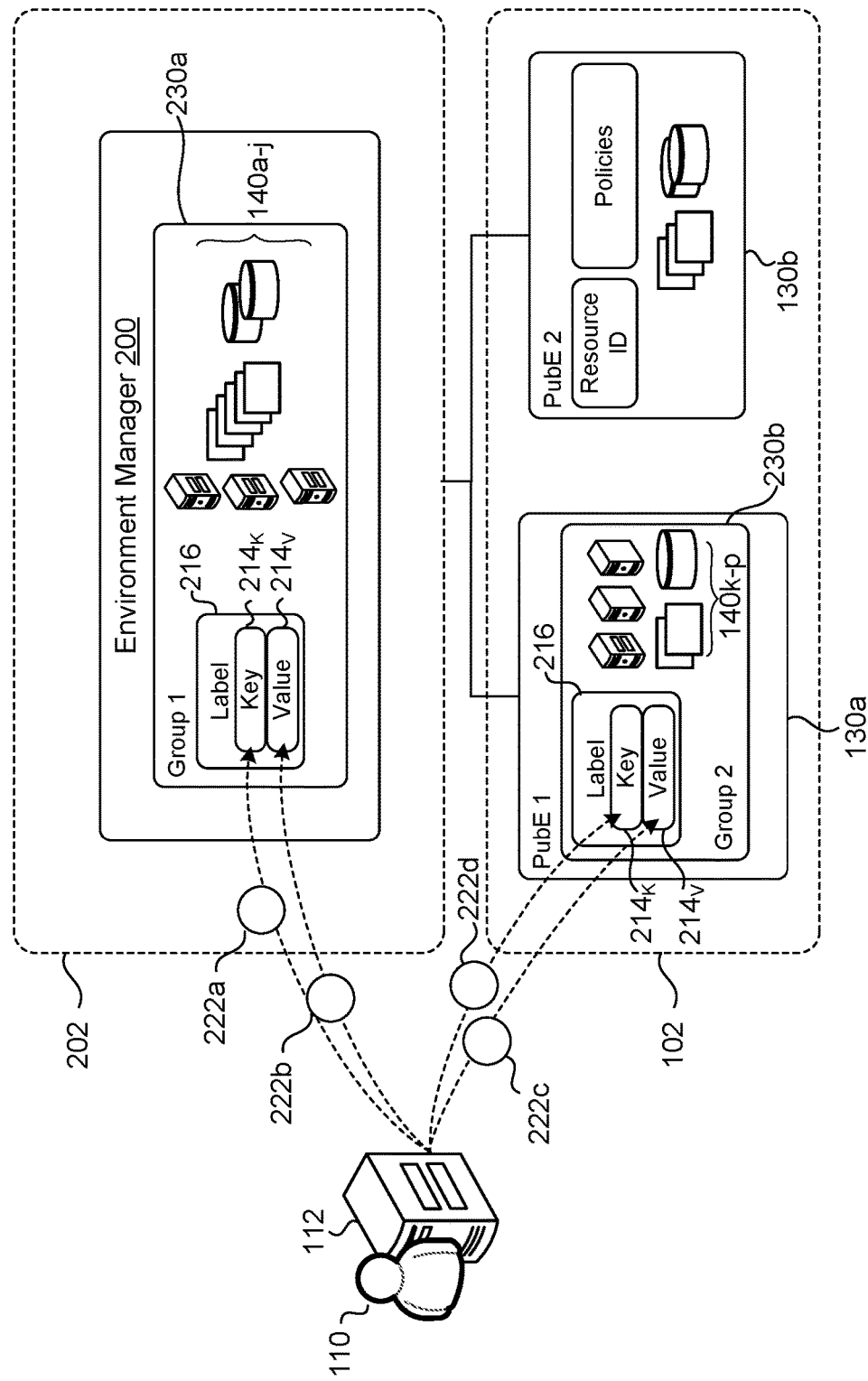
FIG. 2C is a schematic view of a user interacting with either an environment manager layer or an environment layer.

In some configurations, such as FIG. 2C, the user 110 configures a single computing environment 130a to implement policies 132 based on a label structure 212 that is not dictated at the environment management layer 202. For instance, the user 110 predominantly uses resources 140 in a particular computing environment 130. In these instances, the user 110 may setup a single computing environment 130 (e.g., that he or she often uses) with label-managed policies rather than configure the management experience of the manager 200. Even though it is a single computing environment 130, the user 110 may manage his or her resources 140 by dividing these resources 140 into one or more groups 230 (e.g., shown as resources 140k-p assigned to group 230b) by applying a label 216 (e.g., a label 216 with a label structure 212 of a key-value pair 214) to each resource 140 in the group 230. With unique user-defined label(s) 216, the user 110 may assign resource policies 222c-d to the label 216 (e.g., either of the key 214K, the value 214v, or the label 216 generally) to implement a policy 132 on the group 230 (e.g., in a similar manner to the manager 200). FIG. 2C also illustrates that the user 110 may have either option of managing at the management layer 202 (e.g., with the manager 200) or the environment layer 102 (e.g., on the user's own accord).

Figure 3:
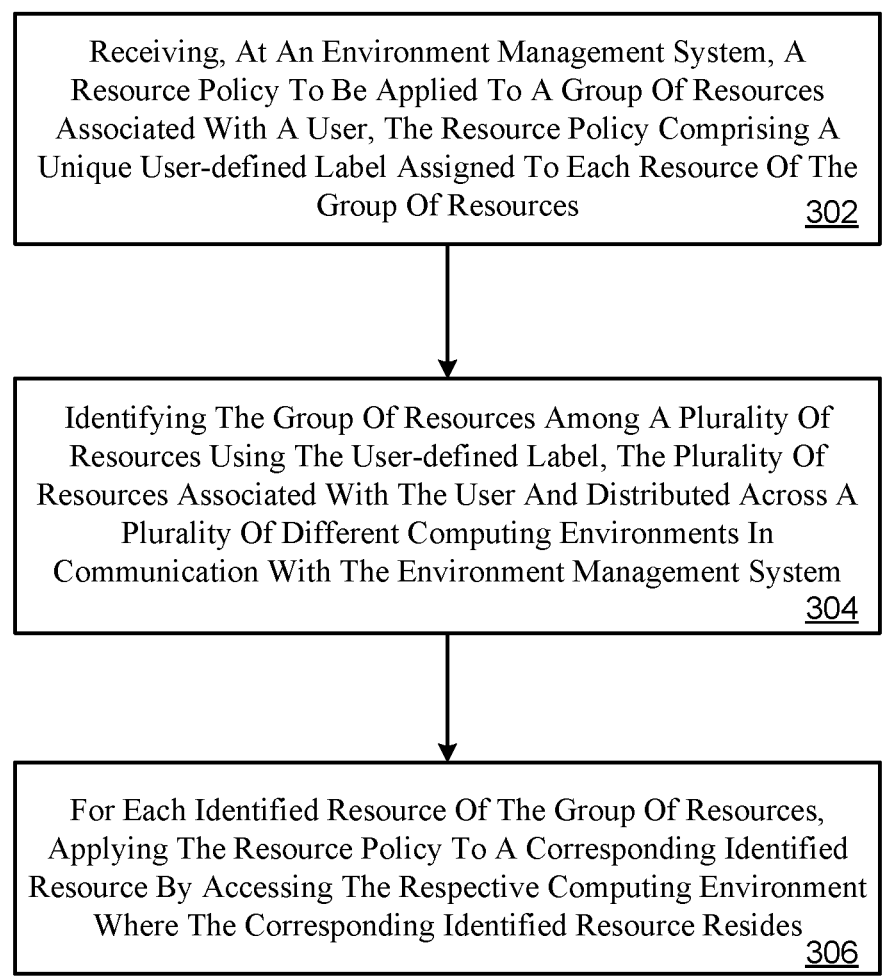
FIG. 3 is an example arrangement of operations for an environment manager.

FIG. 3 is a flowchart of an example arrangement of operations for a method 300 of arbitrarily grouping computer system resources. At operation 302, the method 300 includes receiving, at an environment management system 200, a resource policy 222 to be applied to a group 230 of resources 140 associated with a user 110. The resource policy 222 includes a unique user-defined label 216 (e.g., one or more unique user-defined label 216) that is assigned to each resource 140 of the group 230 of resources 140. At operation 304, the method 300 includes identifying the group 230 of resources 140 among a plurality of resources 140 associated with the user 110 and distributed across a plurality of different computing environments 130 in communication with the environment management system 200. At operation 306, for each identified resource 140 of the group 230 of resources 140, the method 300 includes applying the resource policy 222 to a corresponding identified resource 140 by accessing the respective computing environment 130 where the corresponding identified resource 140 resides.

Figure 4:
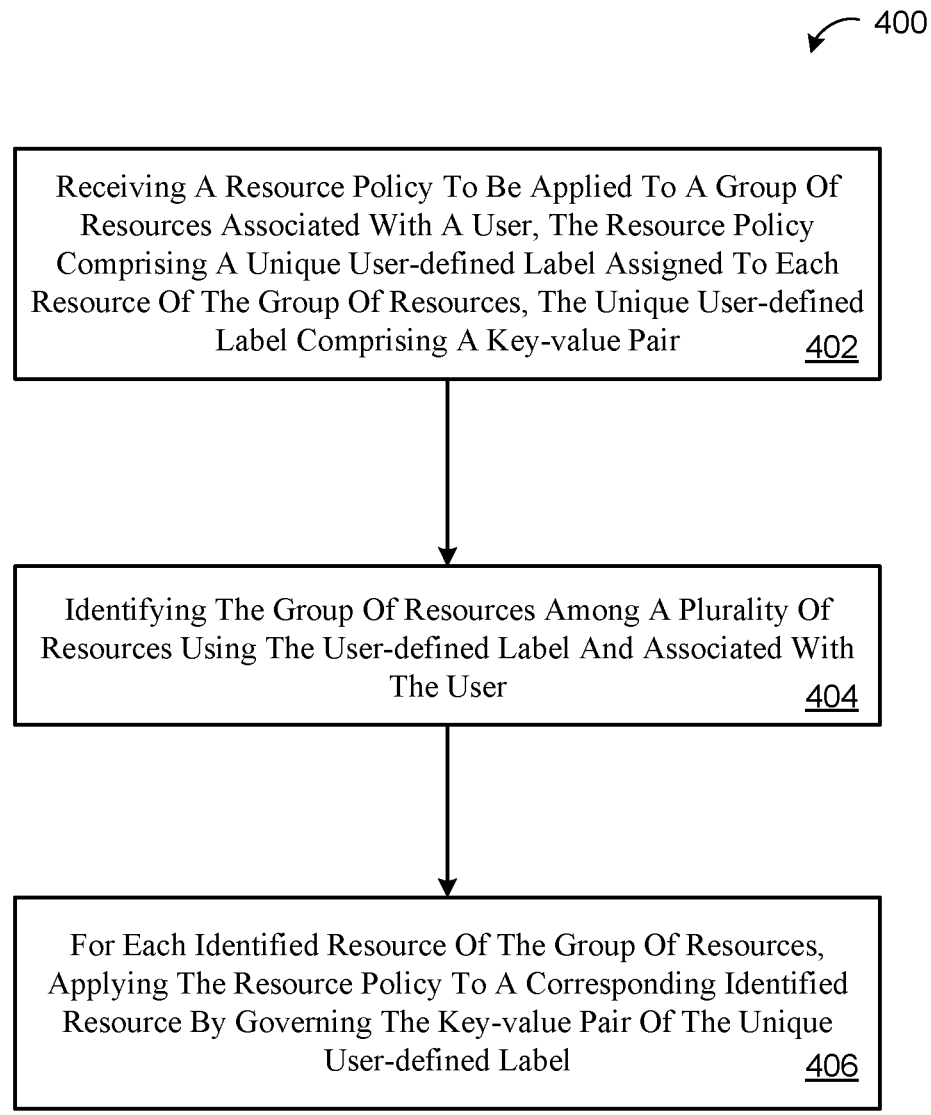
FIG. 4 is an example arrangement of operations for applying policies to resources in a computing environment.

FIG. 4 is an example arrangement of operations for a method 400 of applying policies 132 to resources 140 in a computing environment 130. At operation 402, the method 400 includes receiving a resource policy 222 to be applied to a group 230 of resources 140 associated with a user 110. The resource policy 222 includes a unique user-defined label 216 (e.g., one or more unique user-defined label 216) assigned to each resource 140 of the group 230 of resources 140. Here, the unique user-defined label 216 includes a key-value pair 214. At operation 404, the method 400 includes identifying the group 230 of resources 140 among a plurality of resources 140 using the unique user-defined label 216 and associated with the user 110. At operation 406, for each identified resource 140 of the group 230 of resources 140, the method 400 includes applying the resource policy 222 to a corresponding identified resource 140 by governing the key-value pair 214 of the unique user-defined label 216.

Figure 5:
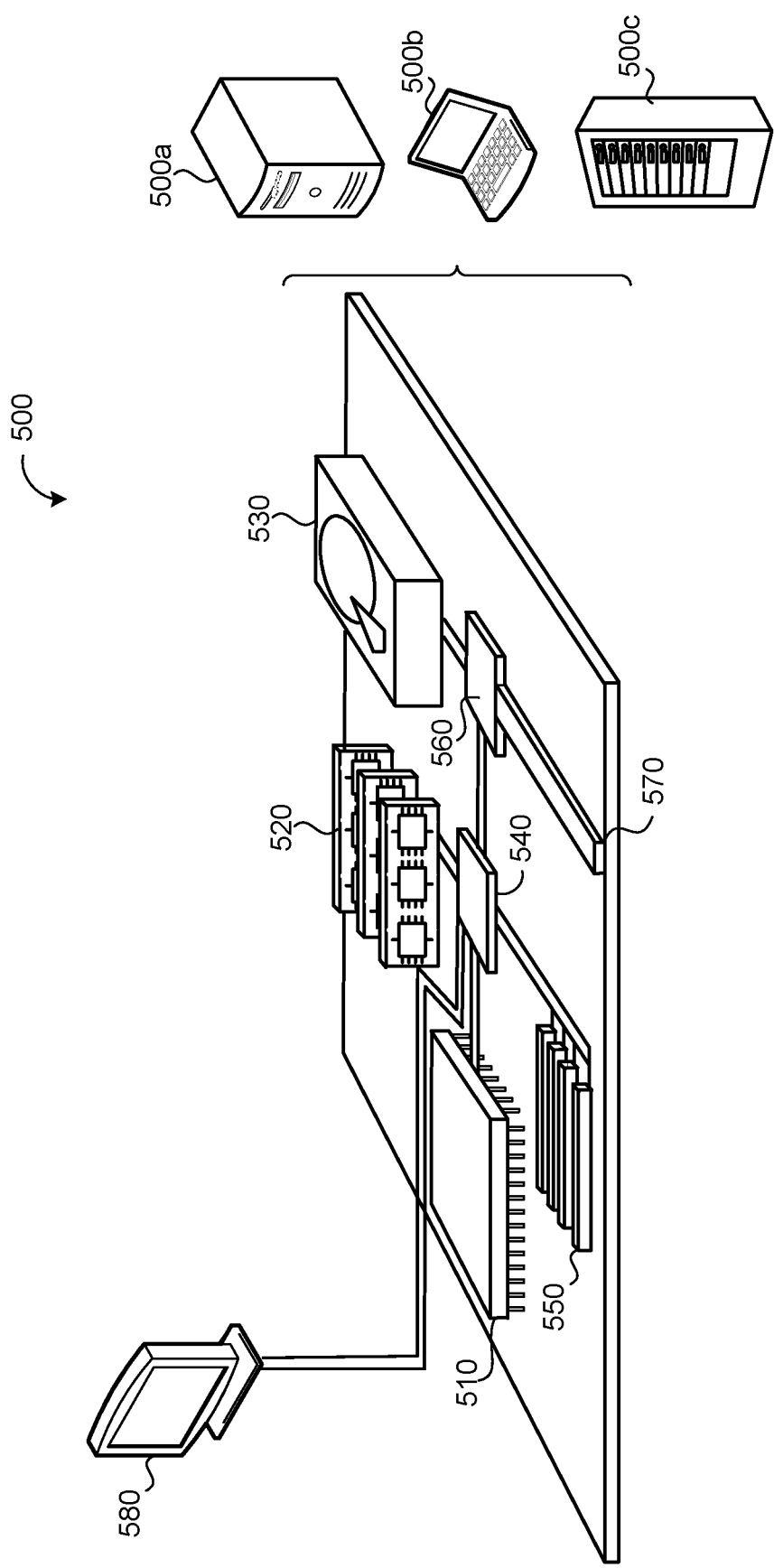
FIG. 5 is a schematic view of an example computing device that may be used to implement the systems and methods described herein.

FIG. 5 is schematic view of an example computing device 500 that may be used to implement the systems (e.g., the manager 200) and methods (e.g., the method 300 and/or the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
assigning, by data processing hardware of a multi-environment manager, a unique user-defined label to each resource of a group of resources associated with a user, the group of resources distributed across at least two different computing environments among a plurality of different computing environments in communication with the data processing hardware, the multi-environment manager forming an abstraction layer that is interoperable with the plurality of different computing environments and configured to:
  access resources associated with the plurality of different computing environments;
  generate resource policies at the abstraction layer for the resources associated with the plurality of different computing environments; and
  deploy, on behalf of the user, resource policies within a respective computing environment of the plurality of different computing environments;
receiving, at the data processing hardware, a respective resource policy to be applied to the group of resources associated with the user, the respective resource policy comprising the unique user-defined label assigned to each resource of the group of resources;
identifying, by the data processing hardware, using the unique user-defined label, the group of resources among a plurality of resources, the plurality of resources associated with the user and distributed across the plurality of different computing environments in communication with the data processing hardware; and
for each identified resource of the group of resources, applying, by the data processing hardware, the respective resource policy to the corresponding identified resource by accessing the respective computing environment where the corresponding identified resource resides.

2. The method of claim 1, wherein the unique user-defined label comprises a key-value pair.

3. The method of claim 2, wherein the respective resource policy further comprises a constraint for the key of the key-value pair for the unique user-defined label.

4. The method of claim 2, wherein the respective resource policy further comprises a constraint for the value of the key-value pair for the unique user-defined label.

5. The method of claim 2, wherein the respective resource policy comprises a first policy for the key of the key-value pair and a second policy for the value of the key-value pair.

6. The method of claim 1, wherein the respective resource policy comprises at least one of an access control policy, a firewall policy, a networking policy, or a quota policy.

7. The method of claim 1, wherein the plurality of different computing environments comprise at least one private computing environment and at least one public computing environment.

8. The method of claim 1, wherein the data processing hardware is configured to communicate with on-premise computing environments, private computing environments, and public cloud-based computing environments.

9. The method of claim 1, wherein the plurality of resources comprise at least one of a virtual machine, a database, a key-value store, or a network.

10. A multi-environment system comprising:
  data processing hardware; and
  memory hardware in communication with the data processing hardware, the memory hardware storing instructions that when executed on the data processing hardware cause the data processing hardware to perform operations comprising:
    assigning, at an abstraction layer that is interoperable with a plurality of different computing environments in communication with the data processing hardware, a unique user-defined label to each resource of a group of resources associated with a user, the group of resources distributed across at least two different computing environments among the plurality of different computing environments in communication with the data processing hardware;
    receiving a respective resource policy to be applied to the group of resources associated with the user, the respective resource policy generated at the abstraction layer and comprising the unique user-defined label assigned to each resource of the group of resources;
    identifying, at the abstraction layer, using the unique user defined label, the group of resources among a plurality of resources, the plurality of resources associated with the user and distributed across the plurality of different computing environments in communication with the data processing hardware; and
    for each identified resource of the group of resources, applying, at the abstraction layer, the respective resource policy to the corresponding identified resource by accessing the respective computing environment where the corresponding identified resource resides.

11. The system of claim 10, wherein the unique user-defined label comprises a key-value pair.

12. The system of claim 11, wherein the respective resource policy further comprises a constraint for the key of the key-value pair for the unique user-defined label.

13. The system of claim 11, wherein the respective resource policy further comprises a constraint for the value of the key-value pair for the unique user-defined label.

14. The system of claim 11, wherein the respective resource policy comprises a first policy for the key of the key-value pair and a second policy for the value of the key-value pair.

15. The system of claim 10, wherein the respective resource policy comprises at least one of an access control policy, a firewall policy, a networking policy, or a quota policy.

16. The system of claim 10, wherein the plurality of different computing environments comprise at least one private computing environment and at least one public computing environment.

17. The system of claim 10, wherein the data processing hardware is configured to communicate with on-premise computing environments, private computing environments, and public cloud-based computing environments.

18. The system of claim 10, wherein the plurality of resources comprise at least one of a virtual machine, a database, a key-value store, or a network.

* * * * *